Feb. 14, 1956
J. A. CRAWFORD
2,735,020
CURRENT TRAP FOR PREVENTING COUPLING
BETWEEN TWO GENERATORS
Filed June 9, 1953
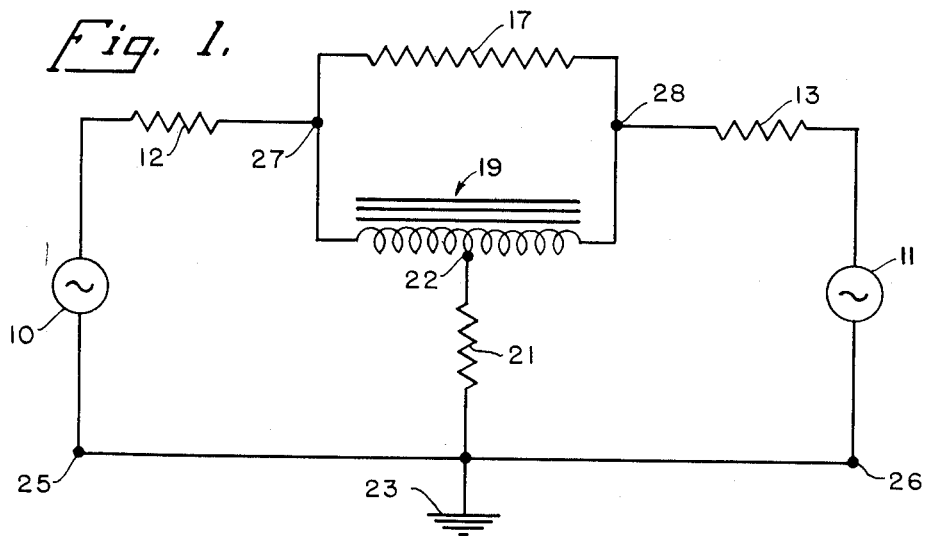
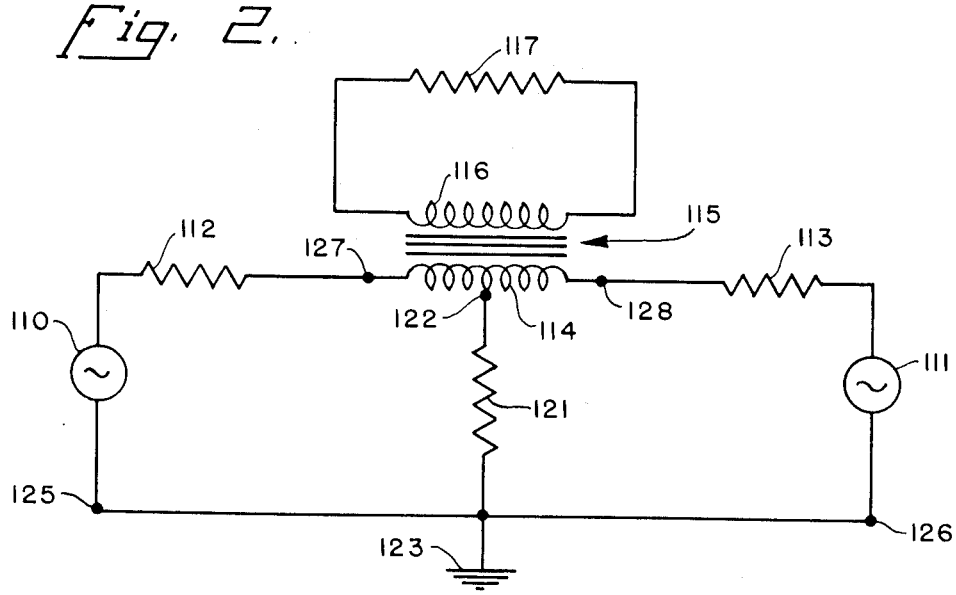
INVENTOR.
JACK A. CRAWFORD
BY
ATTORNEYS

United States Patent Office 2,735,020
Patented Feb. 14, 1956

2,735,020

CURRENT TRAP FOR PREVENTING COUPLING BETWEEN TWO GENERATORS

Jack A. Crawford, Inyokern, Calif., assignor to the United States of America as represented by the Secretary of the Navy Application June 9, 1953, Serial No. 360,620

2 Claims. (Cl. 307—51)

(Granted under Title 35, U. S. Code (1952), sec. 266)

The invention described herein may be manufactured and used by or for the Government of the United States of America for governmental purposes without the payment of any royalties thereon or therefor.

This invention relates to electrical circuits, and in particular to improvements in a current trap for preventing coupling between two generators supplying a common load such as is disclosed in the U. S. patent application of Irvin H. Swift, Serial No. 360,617, filed June 9, 1953.

It is an object of this invention to provide a current trap which will prevent interaction between two series connected generators having a common load impedance, and which requires a minimum number of components.

Other objects and many of the attendant advantages of this invention will be readily appreciated as the same become better understood by reference to the following detailed description when considered in connection with the accompanying drawings wherein:

Fig. 1 is a schematic illustration of one form of the invention, and

Fig. 2 is a schematic illustration of a second form of the invention.

In Fig. 1, two sources of A. C. potential, or generators, 10, 11 having internal impedances, 12, 13 respectively, are connected in series with load impedance 17 having a value $Z_1$. Autotransformer 19 is connected in parallel with load impedance 17, and impedance 21 is connected between the center tap 22 of autotransformer 19 and ground 23. The value of impedance 21 substantially equals $Z_1/4$. Terminals 25 and 26 of generators 10 and 11 are likewise connected to ground 23.

The generated voltage of source 10 is $E_1$, and the generated voltage of source 11 is $E_2$. The frequencies and wave shapes of $E_1$ and $E_2$, respectively, are not restricted. The instantaneous value of the output, or terminal, voltage of source 10, $e_1$, is applied to terminal 27, while the instantaneous value of the output, or terminal, voltage of source 11, $e_2$, is applied to terminal 28. The instantaneous value of the potential of center tap 22 with respect to ground 23 is assumed to be $e_x$. Then by transformer theory, it is known that the potential difference between terminal 27 and center tap 22 is equal to and opposite the potential difference between terminal 28 and center tap 22 so that (1) $$(e_1 - e_x) = -(e_2 - e_x)$$

Solving (1) for $e_x$ yields (2) $$e_x = \frac{e_1 + e_2}{2}$$

The value of the current $i_3$ flowing between center tap 22 and ground 23 through impedance 21 is (3) $$i_3 = \frac{e_x}{Z_1/4} = \frac{2(e_1 + e_2)}{Z_1}$$

where $Z_1$ is the value of impedance 17.

Since the currents in each half of the autotransformer 19 are equal, as is known from transformer theory, it being assumed that the magnetization current is negligible, it follows that the current flowing through each half of autotransformer 19 is equal to (4) $$\frac{i_3}{2} = \frac{e_1 + e_2}{Z_1}$$

The current $i_1$ flowing through generator 10 equals the current $i_4$ flowing through load impedance 17 plus the current $i_3/2$ flowing from terminal 27 to center tap 22. Therefore, (5) $$i_1 = i_4 + i_3/2$$

and (6) $$i_4 = \frac{e_1 - e_2}{Z_1}$$

where $Z_1$ is the value of load impedance 17. Substituting Equations 4 and 6 in Equation 5 yields (7) $$i_1 = \frac{e_1 - e_2}{Z_1} + \frac{e_1 + e_2}{Z_1}$$

(8) $$i_1 = \frac{e_1 - e_2 + e_1 + e_2}{Z_1}$$

(9) $$i_1 = \frac{2e_1}{Z_1}$$

By circuit symmetry it is also known that $i_2$, the current flowing through generator 11 is equal to

(10) $$i_2 = \frac{2e_2}{Z_1}$$

From the foregoing it can be concluded that the current through generator 10, for example, is determined solely by the output voltage of generator 10. From this it follows that the currents $i_1$ and $i_2$ are unaffected by voltages $e_2$ and $e_1$ respectively, so that the terminal voltage of each generator $e_1$ and $e_2$ is independent of the voltage of the other generator.

In Fig. 2 there is illustrated a second embodiment of the invention in which the primary coil of the transformer 115 performs the function of autotransformer 19 of Fig. 1.

Two sources of A. C. potential, or generators, 110, 111 having internal impedances 112, 113, respectively, or connected to have the primary coil 114 of transformer 115 as a load common to both. Load impedance 117 having a value of $Z_{10}$ is connected across the secondary coil 116 of transformer 115. Coil 114 has $N_1$ turns, and coil 116 has $N_2$ turns. Coil 114 has a center tap 122. Impedance 121 which has a value substantially equal to $Z_{10}/4(N_1/N_2)^2$ is connected between center tap 122 and ground 123. Terminals 125 and 126 of generator 110 and 111 are likewise connected to ground 123.

The generator voltage of source 110 is $E_{10}$, and the generated voltage of source 111 is $E_{20}$. The frequencies and wave shapes of voltages $E_{10}$ and $E_{20}$ are not restricted. The instantaneous value of the terminal, or output voltage of source 110, $e_{10}$, is applied to terminal 127, while the instantaneous value of the terminal, or output, voltage of source 111, $e_{20}$, is applied to terminal 128.

The instantaneous value of the potential of center tap 122 with respect to ground 123 can be assumed to be $e_y$. For the reasons set forth in explaining Fig. 1, it can be shown that

(11) $$e_y = \frac{e_{10} + e_{20}}{2}$$

Knowing the potential $e_y$ in terms of $e_{10}$ and $e_{20}$, the value of the current $i_{30}$ flowing between center tap 122 and ground 123 through impedance 121 is then

(12) $$i_{30} = \frac{e_y}{Z_{10}/4(N_1/N_2)^2} = \frac{2(e_{10} + e_{20})}{Z_{10}(N_1/N_2)^2}$$

where $Z_{10}/4(N_1/N_2)^2$ is the value of impedance 121. Since the currents in each half of coil 114 are equal, as is known from transformer theory, it being assumed that the magnetization current is negligible, it follows that the current flowing through each half of coil 114 is $$(13) \quad \frac{i_{30}}{2} = \frac{e_{10}+e_{20}}{Z_{10}(N_1/N_2)^2}$$

The current $i_{10}$ flowing through generator 110 equals the current $i_{40}$ flowing through coil 114 plus the current $i_{30}/2$ flowing from terminal 127 to center tap 122. Therefore, $$(14) \quad i_{10}=i_{40}+i_{30}/2$$

and $$(15) \quad i_{40}=\frac{e_{10}-e_{20}}{Z_{10}(N_1/N_2)^2}$$

where $Z_{10}(N_1/N_2)^2$ is the reflected value of the impedance 117. Substituting Equations 13 and 15 in Equation 14 yields $$(16) \quad i_{10}=\frac{e_{10}-e_{20}}{Z_{10}(N_1/N_2)^2}+\frac{e_{10}+e_{20}}{Z_{10}(N_1/N_2)^2}$$

$$(17) \quad i_{10}=\frac{e_{10}-e_{20}+e_{10}+e_{20}}{Z_{10}(N_1/N_2)^2}$$

$$(18) \quad i_{10}=\frac{2e_{10}}{Z_{10}(N_1/N_2)^2}$$

By circuit symmetry it is also known that $i_{20}$, the current flowing through generator 111 is equal to $$(19) \quad i_{20}=\frac{2e_{20}}{Z_{10}(N_1/N_2)^2}$$

The same conclusions as to the operation of the circuit of Fig. 2 are reached as were reached concerning the operation of the circuit of Fig. 1.

Obviously many modifications and variations of the present invention are possible in the light of the above teachings. It is therefore to be understood that within the scope of the appended claims the invention may be practiced otherwise than as specifically described.

What is claimed is:

1. An electrical circuit comprising a transformer having primary and secondary coils having $N_1$ and $N_2$ turns, respectively, said primary coil having two terminals and a center tap, a load impedance connected across the secondary coil of the transformer, first and second sources of A. C. potential, each source having two terminals, one terminal of the first source of A. C. being connected to one terminal of the primary coil of the transformer, one terminal of the second source of A. C. being connected to the second terminal of the primary coil of the transformer, the other terminals of the first and second sources being common, a second impedance connected between the center tap and the common terminals, said second impedance having a value substantially equal to one-fourth the value of the load impedance multiplied by the square of the ratio of the number of turns of the primary coil to the number of turns of the secondary coil of the transformer.

2. An electrical circuit comprising a load impedance having two terminals, a first source of A. C. potential and a second source of A. C. potential, said sources each having two terminals, one terminal of the first source being connected to one of the terminals of the load impedance, one terminal of the second source being connected to the other terminal of the load impedance, the other terminals of the sources being joined, an autotransformer having a center tap connected in parallel with the load impedance, and a second impedance connected between the center tap of the autotransformer and the joined terminals of the first and second sources, said second impedance having a value substantially equal to one-fourth the value of the load impedance.

References Cited in the file of this patent

UNITED STATES PATENTS

| | | |
|---|---|---|
| 937,469 | Rose | Oct. 19, 1909 |
| 1,373,923 | Unger | Apr. 5, 1921 |
| 2,250,308 | Lindenblad | July 22, 1941 |

OTHER REFERENCES

"Alternating Current Phenomena," by Steinmetz, McGraw-Hill Book Co., 1916; pages 292–3.